US010401534B2

(12) United States Patent
Leger (10) Patent No.: US 10,401,534 B2
(45) Date of Patent: Sep. 3, 2019

(54) METHOD OF CONSTRUCTING A GEOLOGICAL MODEL

(71) Applicant: IFP Energies nouvelles, Rueil-Malmaison (FR)

(72) Inventor: Michel Leger, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 669 days.

(21) Appl. No.: 14/944,419

(22) Filed: Nov. 18, 2015

(65) Prior Publication Data

US 2016/0139299 A1    May 19, 2016

(30) Foreign Application Priority Data

Nov. 18, 2014   (FR) .................................... 14/61.100

(51) Int. Cl.
  *G01V 1/38*    (2006.01)
  *G06G 7/48*    (2006.01)
  (Continued)

(52) U.S. Cl.
  CPC .............. *G01V 99/005* (2013.01); *E02B 1/02* (2013.01); *E02D 1/022* (2013.01); *G01V 1/282* (2013.01); *G01V 1/301* (2013.01)

(58) Field of Classification Search
  CPC ........ G01V 99/005; G01V 1/28; G01V 1/301; G01V 1/003; G01V 1/282; G01V 3/38; E02D 1/1022; E02D 1/022; E02B 1/02
  See application file for complete search history.

(56) References Cited

U.S. PATENT DOCUMENTS 6,374,201 B1    4/2002   Grizon et al.
6,590,832 B2    7/2003   Dubois et al.
(Continued)

FOREIGN PATENT DOCUMENTS

EP    0 889 331 A1    1/1999
EP    1 637 904 A1    3/2006
(Continued)

OTHER PUBLICATIONS

Mallet, J.L.; "Discrete smooth interpolation in geometric modelling"; Computer Aided Design; vol. 24, No. 4, (Apr. 1992), pp. 178-191, London, GB.
(Continued)

*Primary Examiner* — Alonzo Chambliss
(74) *Attorney, Agent, or Firm* — Fitch, Even, Tabin & Flannery LLP (57) ABSTRACT

A method of constructing a geological model of a subterranean formation formed of at least two sedimentary beds is described. Based on measurements of the geometry of boundaries of beds of the subterranean formation carried out on a grid, values of geometry of each bed at any point of the grid are calculated according to at least the steps of defining a succession of coarser and coarser grids, constructed based on the grid of interest; proceeding from the coarsest grid to the grid of interest, determining the geometry of the boundaries of each bed by solving an inverse problem initialized with the result obtained for the previous coarser grid. Next, constructing the geological model based on the completed geometry of each boundary of beds on the grid of interest.

13 Claims, 6 Drawing Sheets

(51) Int. Cl.
*G01V 99/00* (2009.01)
*G01V 1/28* (2006.01)
*G01V 1/30* (2006.01)
*E02B 1/02* (2006.01)
*E02D 1/02* (2006.01)

(56) References Cited

U.S. PATENT DOCUMENTS

| | | | |
|---|---|---|---|
| 6,868,039 | B2 | 3/2005 | Broto |
| 7,310,579 | B2 | 12/2007 | Ricard et al. |
| 8,014,229 | B2 | 9/2011 | Meunier et al. |
| 8,369,653 | B1 | 2/2013 | Cohen |
| 8,423,337 | B2* | 4/2013 | Hsu .................. G01V 11/00 166/250.01 |
| 2004/0243313 | A1 | 12/2004 | Broto |
| 2006/0058965 | A1 | 3/2006 | Ricard et al. |
| 2007/0268781 | A1 | 11/2007 | Meunier et al. |
| 2010/0225647 | A1 | 9/2010 | Flew et al. |
| 2014/0052427 | A1* | 2/2014 | Yahiaoui ............ G06T 17/05 703/10 |
| 2014/0114632 | A1* | 4/2014 | Wu .................. G01V 99/005 703/10 |
| 2015/0131866 | A1* | 5/2015 | Le Ravalec ........... G01V 1/30 382/109 |
| 2015/0212231 | A1* | 7/2015 | Borouchaki .......... G06T 17/20 703/10 |
| 2015/0254567 | A1* | 9/2015 | Imhof .................. G01V 1/301 703/10 |
| 2016/0103246 | A1* | 4/2016 | Freeman ............ G01V 99/005 703/10 |
| 2016/0123120 | A1* | 5/2016 | Al-Zawawi ........... E21B 43/00 703/10 |

FOREIGN PATENT DOCUMENTS

| | | |
|---|---|---|
| FR | 2 804 513 A1 | 8/2001 |
| FR | 2 874 270 A1 | 2/2006 |

OTHER PUBLICATIONS

Adam Pidlisecky et al.; "Cone-based electrical resistivity tomography"; Geophysics, Society of Exploration Geophysicists, vol. 71, No. 4, (Jul. 2006), XP-001245362, pp. G157-G167.

Tobias Frank et al.; "3D-reconstruction of complex geological interfaces from irregularly distributed and noisy point data"; Computers and Geosciences, vol. 33, No. 7 (Jun. 5, 2007), pp. 932-943.

Ascher, U.M. et al.; "Grid refinement and scaling for distributed parameter estimation problems"; Institute of Physics Publishing, Inverse Problems, vol. 17, No. 3, (Jun. 1, 2001), pp. 571-590.

International Search Report dated Jul. 14, 2015, issued in International Application No. FR 1461100.

* cited by examiner

METHOD OF CONSTRUCTING A GEOLOGICAL MODEL

BACKGROUND OF THE INVENTION

Field of the Invention

The present invention relates to the sector of oil exploration and more particular to exploration and exploitation of oil reservoirs or geological gas storage sites.

Description of the Prior Art

The study of an oil field requires the construction of a representation of the subterranean formation being studied, which is also called a geological model in the broad sense or else a geomodel. These models, which are well known and widely used in the oil industry, make possible determination of numerous technical parameters relating to the search for, study or exploitation of a reservoir, of hydrocarbons for example. Thus, a geological model has to be representative of the structure of a reservoir as well as of its behavior. It is thus possible for example to determine the zones which have the most chance of containing hydrocarbons, the zones in which it may be opportune to drill an injection well to improve the recovery of the hydrocarbons, the type of tools to be used, the properties of the fluids used and recovered, etc.

This type of mockup of the subsoil is usually represented on a computer having a grid of grid cells when two-dimensional and a mesh of mesh cells when three-dimensional. Each cell is characterized by one or more petrophysical properties (facies, porosity, permeability, saturation, etc). Even before the phase of filling a 3D mesh with petrophysical properties, the construction of such a mockup must account as faithfully as possible for the geometry of the boundaries between the various geological beds of a formation, and of that of the faults which intersect the geological beds of this formation.

The information regarding the geometry of the boundaries between geological beds and faults generally originates from an interpretation of a seismic image. A seismic image presents the amplitude variations of the seismic waves that were emitted during a seismic acquisition campaign, were propagated in a subterranean formation, and were at least partially reflected at the level of at least one geological bed boundary characterized by a seismic impedance contrast. It will be possible to refer to documents FR 2804513 B1 and corresponding U.S. Pat. No. 6,590,832 and FR 2874270 B1 and corresponding U.S. Pat. No. 8,014,229 relating to seismic acquisition means and procedures. A seismic image is generally given in the form of a three-dimensional grid, oriented along two horizontal axes, and along a third vertical axis which can correspond to the depth (case of a depth seismic image) or else to the time (in the case of a time seismic image it is in terms of depth-time). A boundary between beds is then a two-dimensional surface within a seismic image, and the interpretation of a boundary of beds in a seismic image results in a measurement of the depth or of the time of the boundary of beds in question in grid cells of a two-dimensional grid whose reference frame is oriented along the horizontal axes of the seismic image.

The interpretation of the boundaries between geological beds of a subterranean formation is generally incomplete. Indeed, a seismic image is most often noisy, in particular close to the faults, and more generally in the structurally complex zones. Consequently, it is very often not easy to continuously follow each boundary between beds. The result of a seismic interpretation then consists of sparse measurements of the geometry of the boundaries between the beds of the formation being studied. It will be possible to refer to applications FR 2854468 B1 and corresponding U.S. Pat. No. 6,868,039 and FR 1669778 B1 and corresponding U.S. Pat. No. 734,595 relating to the difficulties in interpreting seismic data. In order to construct a mockup of the formation being studied, it is therefore generally necessary to resort to a step making it possible to complete the interpretation of the boundaries between geological beds, so as to have an estimation of the geometry of each of the boundaries between beds of the formation in each of the mesh cells of the grid on which the mockup of the formation being studied is established. This process is generally known by the term data interpolation, but it should be understood as not excluding an extrapolation phase. Indeed, interpolation is used to fill the empty mesh cells of a grid that are situated in zones delimited by actual measurements of the geometry, and an extrapolation phase is resorted to for mesh cells situated outside of the zones for which measurements are available.

Moreover, very often, applications using a geological model (for example reflection tomography, stratigraphic inversion, basin modeling, reservoir simulation, or else mapping on UTM coordinates) require that the boundaries of beds of a geological model be continuously differentiable (C1 continuity). More precisely, these procedures require that the interpolation/extrapolation of the sparse measurements of the geometry of the boundaries of beds be carried out while complying with the known dips, that is to say that the dip of the result of the interpolation/extrapolation in a given grid cell should be consistent with the dip of the actual measurements of the geometry of the boundaries between beds, at their border. The dip of a boundary of beds in a given grid cell is understood to mean the angle between the line of greatest slope of the plane that the boundary between beds in question forms at the level of the mesh cell being considered, and a horizontal plane. To calculate a dip in a given mesh cell, the grid cell in question and the directly neighboring grid cells are therefore considered.

Prior Art

The following documents will be cited in the course of the description:

Inoue, H., A least-Squares smooth fitting for irregularly spaced data: finite element approach using the cubic {B}-splines basis, Geophysics, 51, 2051-2066, 1986.

Léger M., Interpolation with Triangulated Surfaces and Curvature Minimisation, in *Curves and Surfaces with Applications in CAGD*, A. Le Méhauté, C. Rabut, and L. L. Schumaker (eds.), Vanderbilt Univ. Press, Nashville, 1997, 85-94.

Mallet, J.-L., Discrete smooth interpolation in geometric modelling. *Computer-Aided Design*. Vol 24, Issue 4, April 1992, pp 178-191.

Wheeler, H., Time-Stratigraphy, 1958, BULLETIN OF THE AMERICAN ASSOCIATION OF PETROLEUM GEOLOGISTS, VOL. 42, NO. 5 (May 1958), PP. 1047-1063.

Generally, a way of interpolating/extrapolating sparse measurements over all the grid cells of a grid calculates a mathematical representation representative of the measurements. In the case of a boundary of beds of a formation, this amounts to determining a mathematical representation covering all the grid cells of the grid in question, and passing, as well as possible, through the actual measurements of the geometry of the boundary of beds.

A well-known interpolation/extrapolation procedure, which is beneficial from the calculation time point of view, is based on the use of B-spline functions (Inoue, 1986). A B-spline function is generated by summing polynomials of a certain degree. Usually, it is cubic B-splines that are used, based on polynomials of degree 3. Thus, by construction, the first and second derivatives of a cubic B-spline function are continuous (C1 and C2 continuity respectively). B-spline function interpolation generally solves a regularized inverse problem, that is to say that the parameters of the polynomials of the B-spline function best explain the actual measurements of the geometry of the boundaries between beds, while satisfying a regularization parameter pertaining to the result sought. Thus, usually, the endeavor is that the result of the B-spline function does not exhibit significant roughness, in particular in the zones where the measurements are missing. Accordingly, the endeavor is to minimize the second derivatives of the B-spline function, while best satisfying the actual measurements of the geometry of the bed boundaries. However, the interpolation of sparse measurements on a grid by B-spline function turns out to be very sensitive to the choices of the parameterization of the inverse problem (number of parameters of the B-spline function, regularizing weight of the objective function to be minimized in particular) and very often requires several manual interventions by the user before obtaining a geologically plausible result.

Another well-known procedure represents the boundaries of beds by triangulated surfaces (Mallet, 1992; Léger, 1997). One of the main drawbacks of this procedure resides in the fact that the mathematical representation obtained is not continuously differentiable (that is to say that the C1 continuity is not satisfied), a property that is very often required.

A particular procedure for completing sparse measurements of the geometry of a boundary between beds, without having to determine any mathematical representation passing through the measurements, solves an inverse problem aimed at minimizing the second derivatives of the geometry of the boundary between beds in question at the level of the grid cells for which a measurement is missing. This signifies that the endeavor is to complete the empty grid cells of a grid in such a way that the second derivatives at the level of the completed grid cells are as small as possible, or else that the roughness of the geometry of a boundary of beds is lower in the completed grid cells. Moreover, the minimization of the second derivatives, in the case of a two-dimensional grid, guarantees C1 continuity of the result. This signifies that the minimization of the second derivatives of the geometry of a boundary between beds in the case of a two-dimensional grid makes it possible to exploit the dip information, known in certain groups of grid cells, and to extrapolate this information while complying with these dips known in the zones of the grid where the grid cells are empty.

A procedure conventionally used to minimize an objective function composed of second derivatives is the conjugate gradient procedure. However, in order for the minimization to succeed, minimization by conjugate gradient generally implies that the number of iterations of the conjugate gradient is equal to the number of unknowns. This signifies that the conjugate gradient is a very expensive algorithm in terms of calculation time, since the number of unknowns (that is to say the number of empty grid cells) for a boundary between beds of a subterranean formation can be of the order of a hundred thousand.

SUMMARY OF THE INVENTION

The present invention relates to a method of constructing a geological model of a subterranean formation, comprising performing an interpolation/extrapolation of sparse measurements of the geometry of the boundaries between beds of the formation in question. The interpolation/extrapolation procedure according to the invention is fast, entirely automatic and, can make it possible to ensure the continuity of the dips (C1 continuity), and does not require any mathematical representation.

Thus, the present invention relates to a method of constructing a geological model of a subterranean formation formed of at least two sedimentary beds, on the basis of $N'_0$ measurements of the geometry of the boundaries of the beds, the $N'_0$ measurements of a the boundary being carried out in a number $N'_0$ of grid cells of a two-dimensional grid $G_0$ with the grid $G_0$ having $N_0$ grid cells. The method comprises:

determining for each boundary of the beds, the geometry of the boundary between beds in each grid cell of the grid $G_0$ according to at least the following steps:

a) constructing nk grids $G_k$ based on the grid $G_0$, with each of the grids $G_k$, with k varying from 1 to nk and having a smaller number of grid cells than that of a grid $G_{k-1}$ with k varying from 1 to nk;

b) assigning each of the grids $G_k$, such that k lies between 1 and nk, by interpolation of the $N'_0$ measurements of the geometry on corresponding grid cells of the grid $G_k$;

c) determining the geometry of the boundary between beds in each grid cell of the grid $G_0$ from the geometry of the boundary between beds in each grid cell of each of the nk grids $G_k$, with k varying from 1 to nk, by applying successively, from the grid $G_{nk}$ to the grid $G_0$, an iterative procedure to minimize an objective function dependent on a property relating to the geometry of the boundary between beds, and by initializing each of the grids $G_k$, with k varying from 0 to nk−1, with the geometry of the boundary between beds being determined on the grid $G_{k+1}$; and constructing the geological model based on the geometry of each of the boundaries of beds determined in each mesh cell of the grid $G_0$.

According to one mode of implementation of the invention, it is possible to construct the nk grids $G_k$, with k varying from 1 to nk, by applying a scale factor f successively nk times to the spatial sampling intervals of the grid $G_0$.

According to another mode of implementation of the invention, the scale factor f can be vectorial and can be a scalar value in each of the directions of the reference frame of the grid $G_0$.

According to a preferred mode of implementation of the invention, the scale factor f can be scalar.

Preferentially, the scale factor f can equal 2.

Advantageously, based on a predefined number of iterations Iter and by assuming a doubling of the iterations of the iterative procedure from a grid $G_k$ to a grid $G_{k+1}$, with k varying 0 to nk, an optimal number nk of the grids $G_k$ to be constructed can be determined according to a formula:

$$nk = \text{ceiling}\left(\log2\left(\frac{N0 - N'0}{Iter}\right)\right),$$

where ceiling is a function which associates, with a real number, an immediately higher integer.

According to one embodiment of the invention, the property relating to the geometry of the boundary between beds can be the continuity of the dips in a mesh cell with a dip being an angle between a line of greatest slope of a plane boundary of the beds.

Preferentially, the objective function for a grid $G_k$, with k varying from 0 to nk, can be dependent on the sum of the property's second derivatives calculated at the level of the grid cells to be completed of the grid $G_k$ being considered.

In a very preferred manner, iterative procedure used to minimize the objective function can be a conjugate gradient procedure.

According to one embodiment of the invention, it is possible to initialize each grid cell of a grid $G_k$, with k varying from 0 to nk−1, based on a bi-linear interpolation of the geometry of the boundary between beds determined in each grid cell of the grid $G_{k+1}$.

According to one embodiment of the invention, it is possible to construct the geological model by constructing a volumetric mesh based on each of the boundaries between beds and allotting to each grid cell of the volumetric mesh at least one value of a petrophysical property representative of the formation.

Preferentially, it is possible to account for the presence of faults by zeroing the value of the second derivatives at the level of the faults.

Furthermore, the invention relates to a computer program product which is one of downloadable from a communication network and recorded on a tangible recording medium readable by computer and executable by a processor, comprising program code instructions for the implementation of the method according to one of the preceding claims, when the program is executed on the processor.

It is possible to define a method of exploiting a subterranean formation by carrying out the following steps:
constructing a geological model of the formation by use of the method of constructing a geological model according to the invention;
determining an optimal exploitation scheme for the reservoir based on the geological model; and
exploiting the reservoir by implementing the optimal exploitation scheme.

BRIEF DESCRIPTION OF THE DRAWINGS

Other characteristics and advantages of the method according to the invention will become apparent from reading the description hereinafter of nonlimiting examples of embodiments, while referring to the appended figures described hereinafter.

DETAILED DESCRIPTION OF THE INVENTION

Figure 4A:
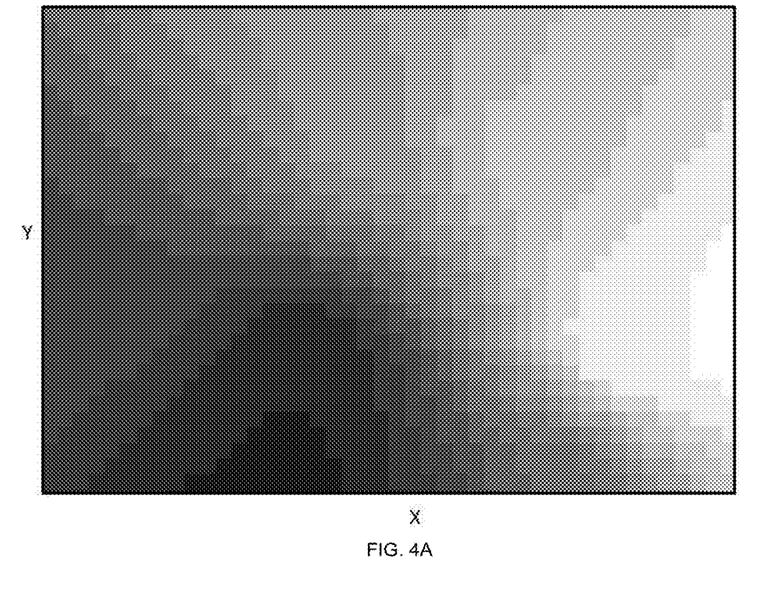
FIGS. 4A to 4E present the geometry of a completed boundary between beds, obtained respectively for grids $G_4$ to $G_0$, from the use of the method according to the invention.
Figure 4B:
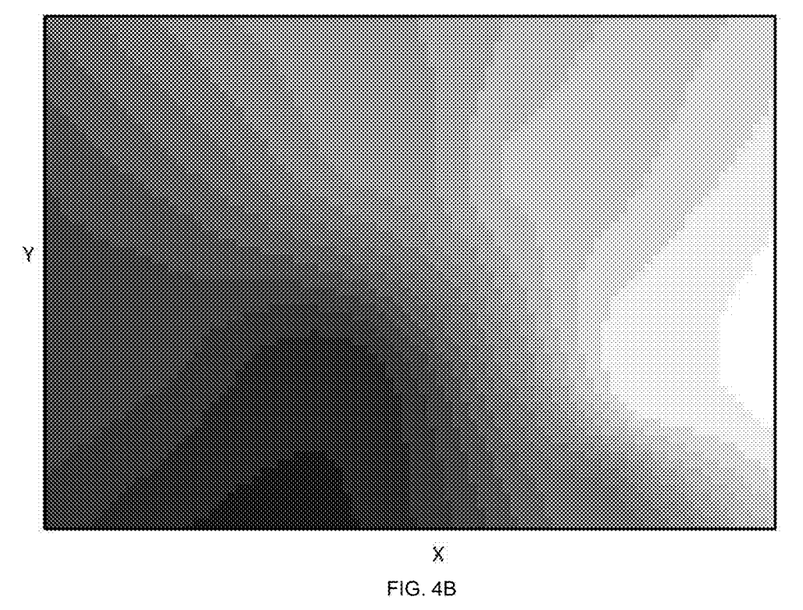
Figure 4C:
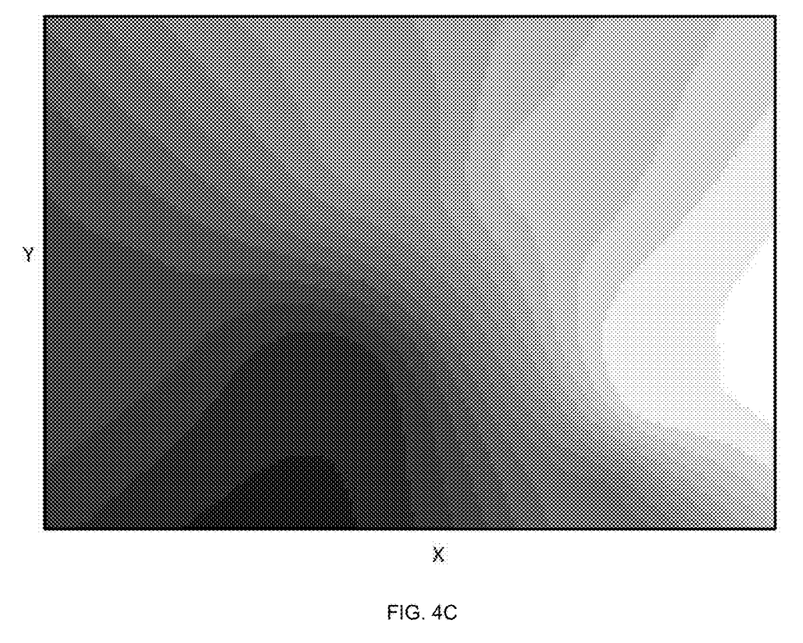
Figure 4D:
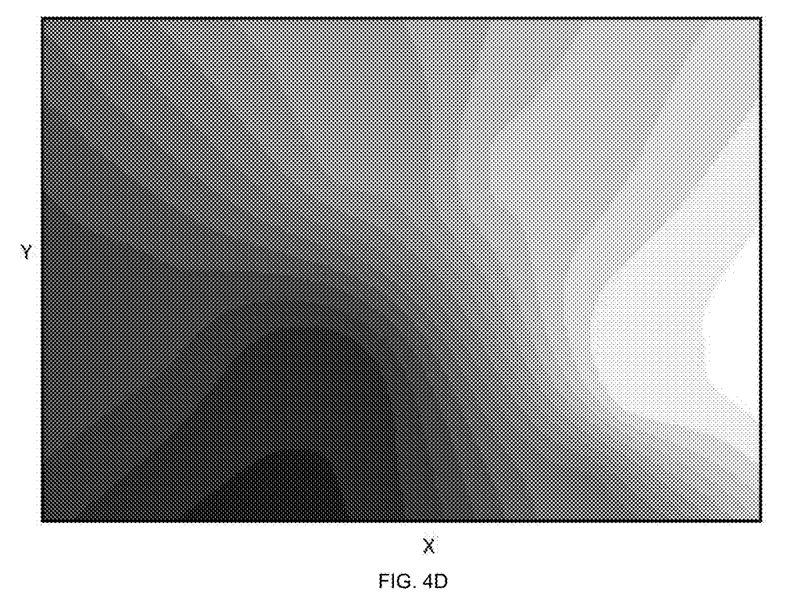
Figure 4E:
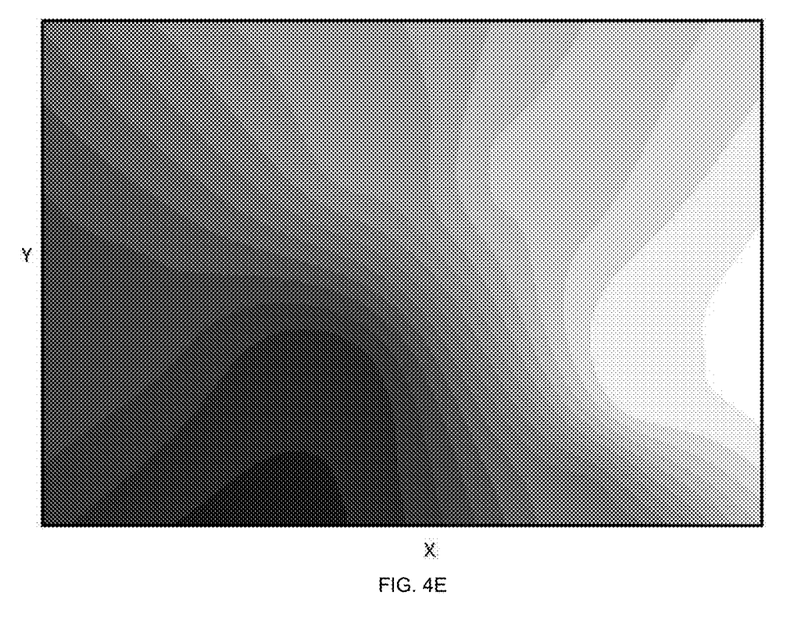

The following definitions are used in the course of the description of the invention:

Boundary of geological beds: It is the two-dimensional surface at the interface between two geological beds which is called a boundary between geological beds such as FIG. 4E which is identified by numeral 40. The boundary between two geological beds corresponds to the roof of one of the beds and to the base (also known by the term "wall") of the other. The geometry of a boundary of beds is a measured in depth in the direction in FIGS. 4A to 4E of variations of a bidimensional surface in x,y space. A boundary between geological beds of a subterranean formation implies that the subterranean formation comprises at least two geological beds;

Geometry of bed boundaries: It is the inclines and also the lateral variations of inclines of a boundary between beds which are called the geometry between bed boundaries, as seen for example FIG. 4E as a variation in depth Z of the bed boundary 40 with the inclines being able to be depths (in the case of a depth seismic image) or else times (in the case of a time seismic image);

Fine grid: It is the two-dimensional grid of interest, that is the grid on which, in each grid cell, the geometry of a given boundary between beds, is called a fine grid. The fine grid is defined by a sampling interval along each of its axes. This grid is denoted $G_0$ subsequently;

Coarse grid: It is an enlarged version of the fine grid of interest which is called a coarse grid. A coarse grid has the same spatial boundaries as the fine grid of interest, but is characterized by at least one sampling interval in a direction which is greater than the corresponding sampling interval of the fine grid $G_0$. A coarse grid therefore comprises a smaller number of mesh cells than the number of mesh cells of the fine grid. A coarse grid is denoted $G_k$, with k>0, subsequently.

The present invention relates to a method of constructing a geological model of a subterranean formation comprising at least one boundary between geological beds, based on an alternative to the known procedures for interpolation/extrapolation of geometry of incomplete measurements of boundaries between geological beds on a given grid, involving a succession of coarser and coarser grids constructed based on the grid of interest, and in which, proceeding from the coarsest grid to the grid of interest, the geometry of the boundaries between each bed being considered is completed by solving an inverse problem initialized with the result obtained for the previous coarser grid.

Thus, the present invention exploits the fact that for an inverse problem, if it is initialized with a good approximation of the result, converges rapidly (that is to say according to a smaller number of iterations than the number of empty grid cells), and, what is more, toward a solution acceptable to persons skilled in the art. The initialization according to the invention uses a result of an optimization on a coarse grid, with a sufficient number of iterations to guarantee convergence. The number of grid cells of the coarse grid is smaller than the number of grid cells of the grid of interest, even if more iterations are carried out on the coarse grid than on the fine grid, the overall cost of the process (calculation times) is lowered. This reasoning can be adopted gradually, by considering nk coarser and coarser versions of the grid of interest. With the grid $G_{nk}$ having a restricted number of mesh cells, it is possible to allow solving the inverse problem with as many iterations as necessary, and the result obtained then serves to initialize in an ad hoc manner the inverse problem for the following less coarse grid $G_{nk-1}$, and so on and so forth.

The present invention makes it necessary to have measurements of the geometry of at least one boundary of geological beds of a subterranean formation. Prior to the implementation of the method according to the invention, it is possible to resort to the following steps to acquire measurements of the geometry of at least one boundary of geological beds:

Acquisition of seismic data;
Processing of the seismic data acquired;
Interpretation of the seismic image resulting from the processing of the seismic data acquired.

The step of acquiring the seismic data generally implements the principle of seismic reflection. Seismic reflection emits a wave or several waves (by explosive or vibration in terrestrial seismic surveys, by air gun or water gun in marine seismic surveys) and records the signals representing the amplitude variations of the waves that are propagated in the water or the subsoil, and are at least partially reflected at the level of at least one geological bed boundary (also called an interface) characterized by a seismic impedance contrast. The recording of the waves that are reflected is performed by acceleration sensors (seismometers), vibration sensors (geophones) or pressure sensors (hydrophones), or by a combination of elementary sensors of the above types (for example multi-component sensors or OBCs ("Ocean Bottom Cables")) located at given geographical positions. The signal recorded, typically over a few seconds, by a given sensor is called a seismic trace. The seismic data correspond to a collection of one or more seismic traces, arising from sensors located at various spatial positions, forming a volume in two or three dimensions (one of time, one or two of space), or indeed in four dimensions if repetitive seismic acquisitions are included (acquired in one and the same region with various temporal periods). The distance between a seismic source and a seismic sensor is called the offset. The seismic data recorded in the course of a seismic reflection experiment are termed multi-offsets or else pre-summation ("prestack"), that is to say that the signal emitted by a given source is recorded by several sensors situated at various offsets.

The, so-called raw, seismic data recorded are very often unexploitable. According to the quality and the characteristics of the recorded data, various seismic processing steps are applied, such as corrections of amplitudes, deconvolution, static corrections, filtering of noise (random or coherent), NMO ("Normal Move Out") correction, stack (or "summation", leading to a cross section with zero offset or post summation of the seismic data pre summation), or else migration. These processing steps, requiring calculations which are often very complex and very lengthy, are carried out by computer. The resulting seismic data are then called a seismic image. These seismic images are usually represented on a computer, by a three-dimensional mesh or grid with each grid cell corresponding to a lateral and vertical position (the vertical direction corresponding to time or to depth depending on whether the processing has culminated in a time image or in a depth image) within the formation being studied and being characterized by a seismic amplitude. If the seismic processing applied to the recorded seismic data is optimal, the seismic amplitude in a given mesh cell of a seismic image should reflect the amplitude of the seismic wave that has undergone a single reflection (so-called primary reflection) at the position of the mesh cell being considered in the formation studied.

The seismic images arising from this processing are thereafter used to carry out a seismic interpretation. These interpretations are generally conducted by a geologist or else a geophysicist. An interpretation of seismic data is aimed at determining the characteristics of the formation being studied, especially in terms of positioning and geometry of the boundaries between geological beds and faults of the formation (structural interpretation), but also in terms of seismic amplitudes, which inform regarding the petro-physical properties of the formation being studied (lithological interpretation). In the case of structural interpretation, the main boundaries of beds are identified (aided for example by information gleaned at the wells) and will then laterally "follow" the boundaries of beds identified (seismic horizons) throughout the seismic image, grid cell after grid cell. This interpretation phase is generally carried out by computer, with the aid of seismic interpretation software (for example with the aid of the Charisma® software, Schlumberger (France)), and leads to a measurement of the depth or of the time of the boundary between beds in question in grid cells of a two-dimensional grid whose reference frame is oriented along the horizontal axes of the seismic image. Very often, the seismic data are noisy and the number of measurements of the geometry of a boundary between beds is less than the number of grid cells of the grid in question.

In the course of this description, it is considered that $N'_0$ measurements of the geometry of at least one boundary between beds of a subterranean formation are available with the $N'_0$ measurements having been carried out in a number $N'_0$ of grid cells of a fine grid $G_0$ having $N_0$ grid cells.

The present invention then comprises at least the following steps:

1) determination of the geometry of each boundary between beds, with application, for each boundary of beds, the following steps:
   1.1) construction of nk coarse grids
   1.2) assignment of the nk coarse grids
   1.3) nested determination of the geometry of a boundary between beds
     1.3.1) initialization of each inverse problem
     1.3.2) solving of each inverse problem
2) construction of the geological model The main steps of the method according to the invention are detailed hereinafter.

1) Determination of the Geometry of Each Boundary of Beds

This step entails determining the geometry of each boundary between beds of the formation being studied in each grid cell of the grid of interest. Steps 1.1) to 1.3) to be applied for each boundary between beds of the formation being studied are described hereinafter.

It is recalled that the measurements of the geometry of a boundary between beds can be obtained by an interpretation of seismic data, which possibly arise from a seismic acquisition campaign then from a step of processing the acquired seismic data.

1.1) Construction of nk Coarse Grids

This step entails constructing a predetermined number nk of coarse versions $G_k$ of the fine grid $G_0$, with k varying from 1 to nk. A coarse grid $G_k$ has the same spatial boundaries between grids as the fine grid $G_0$, but is characterized by a smaller number of grid cells.

According to one embodiment of the present invention, nk coarse versions $G_k$ of the fine grid $G_0$ are constructed by applying a scale factor f successively nk times to the spatial sampling intervals of the fine grid $G_0$.

According to a particular mode of implementation of the present invention, the scale factor f is vectorial and is characterized by a scalar value specific to each axis of the reference frame of the grid. Thus, it is possible to apply a different scale factor value according to the direction considered.

According to a preferred mode of implementation of the present invention, the scale factor f is scalar.

Very preferentially, a scalar scale factor equal to 2 is chosen. Thus, a coarse grid $G_k$, with k varying from 1 to nk, is an enlargement by a factor 2 of the grid $G_{k-1}$, and is an enlargement by a factor $2^k$ of the fine grid $G_0$.

According to one embodiment in which the scale factor is a scalar and equals 2, a number of iterations Iter can be defined of a minimization algorithm to be carried out to minimize the objective function on the fine grid $G_0$, as well as a doubling of the number of iterations to be carried out by this minimization algorithm from one grid to another. An optimal number nk of the coarse grids $G_k$ to be constructed, with k>0, can then be determined according to a formula of the type:

$$nk = \text{ceiling}\left(\log_2\left(\frac{N_0 - N'_0}{Iter}\right)/3\right) \quad (1)$$

where ceiling is a function which associates, with a real number, the immediately higher integer.

1.2) Assignment of the nk Coarse Grids

This step entails, for a given coarse grid $G_k$, with k varying from 1 to nk, allotting a geometry value to the grid cells of the coarse grid $G_k$ which correspond to at least one grid cell of the fine grid $G_0$ and for which a measurement has been performed. By corresponding grid cell is understood the grid cell of the grid $G_k$ which contains the center of gravity of the grid cell of the grid $G_0$ considered.

More precisely, for a given coarse grid $G_k$, with k varying from 1 to nk, the $N'_0$ measurements of the geometry are interpolated, stricto sensu, on each of the grid cells of the corresponding coarse grid $G_k$. This does not therefore entail completing all the grid cells of the coarse grids, but simply transposing the measurements carried out on the fine grid $G_0$ onto each of the coarse grids $G_k$.

According to one mode of implementation of the present invention, the value of the average of the measurements carried out on the grid cells of the grid $G_0$ whose center of gravity is contained in the grid cell of the grid $G_k$ being considered is allotted to a grid cell of a given grid $G_k$, with k varying from 1 to nk.

According to one mode of implementation of the present invention, for each grid cell of a given coarse grid $G_k$, with k varying from 1 to nk, eight angular sectors are considered, defined based on the center of gravity of the mesh cell being considered. Next, for each angular sector, it is determined whether there exists at least, in the sector being considered, three measurements carried out on the fine grid $G_0$, and an average value of the geometry for this angular sector is then calculated. Next, the average of the values thus obtained for each sector is calculated, and this average is allotted to the grid cell of the grid $G_k$ being considered. In this manner, the value allotted to a grid cell of the grid $G_k$, with k varying from 1 to nk, complies with the dips resulting from the measurements on the corresponding grid cells of the fine grid $G_0$.

1.3) Nested Determination of the Geometry of a Boundary of Beds

This step entails, proceeding from the coarsest grid $G_{nk}$ to the fine grid of interest $G_0$, determining, in a successive manner, the geometry of the boundary between beds which is considered in each grid cell of each of the grids, doing so by initializing the inverse problem specific to each grid with the geometry of the bed determined on the previous less coarse grid. The inverse problem considered in the present invention is aimed, for each grid being considered, at minimizing an objective function dependent on an expected property of the geometry of the boundary of beds which is considered in the empty grid cells of this grid.

1.3.1) Initialization of Each Inverse Problem

The minimization of an objective function is an iterative process which requires an initialization of the quantities sought. A grid $G_k$, with k varying from 0 to nk−1, is initialized based on the values of the completed grid $G_{k+1}$. It is for example possible to initialize a grid $G_k$, with k varying from 0 to nk−1, by a bilinear interpolation of the values of the completed grid $G_{k+1}$. When k equals nk, the grid $G_{nk}$ is initialized based on, for example, a linear regression on the result of the assignment step described previously in section 1.2).

In this manner completion of the empty grid cells of a grid $G_k$, with k varying from 0 to nk, is sought by accounting for the result obtained on a previous coarser grid. By proceeding gradually from a more coarse grid, to a less coarse grid, doing so until the fine grid of interest $G_0$, the inverse problem is well posed, and a solution can advantageously be found in a restricted number of iterations.

1.3.2) Solving of Each Inverse Problem

For a given grid $G_k$, with k varying from 0 to nk−1, the method according to the invention minimizes an objective function dependent on an expected property of the geometry of the boundary of beds which is considered in the empty grid cells of the grid considered. The property in question can be deduced from the characteristics of the geometry of the boundary between beds which is considered in the grid cells for which a measurement of the geometry is known (by direct measurement on the fine grid $G_0$, or after the assignment step described previously in section 1.2 for a coarse grid $G_k$ such that k varies from 1 to nk).

According to a preferred mode of implementation of the present invention, the grid cells of a grid $G_k$, with k varying from 0 to nk, are completed in such a way to safeguard, in the empty grid cells of this grid, the continuity of the measured dips (C1 continuity). Preferentially, a value of the geometry of a boundary of beds in each empty mesh cell of a grid is determined by minimizing the second derivatives calculated at the level of the empty grid cells of this grid.

According to one embodiment of the present invention, the objective function is composed of the weighted sum of the second derivatives of the geometry of the boundary of beds in each empty mesh cell (i,j) of a grid $G_k$, the number of empty grid cells being $N''_k = N_k - N'_k$, with k being able to vary from 0 to nk. This signifies that determination of values of the geometry of the boundary between beds in the grid cells for which a value is missing, such that the calculated values give rise to minimum second derivatives. Stated otherwise, one seeks to fill in a sparse grid with values guaranteeing low roughness of the final grid. The discrete objective function to be minimized can then be written:

$$F = \sum_{N''_k} \varepsilon_{ij}^{D_{2i}} D_{2i}(i, j) + \sum_{N''_k} \varepsilon_{ij}^{D_{2ij}} D_{2ij}(i, j) + \sum_{N''_k} \varepsilon_{ij}^{D_{2j}} D_{2j}(i, j),$$

with $D_{2i}(i, j) = m_{i-1,j} - 2m_{i,j} + m_{i+1,j}$, $D_{2ij}(i, j) = m_{i,j} - m_{i+1,j} - m_{i,j-1} + m_{i+1,j+1}$, and $D_{2j}(i, j) = m_{i,j-1} - 2m_{i,j} + m_{i,j+1}$, where $m_{i,j}$ is a measurement of the geometry of the boundary between beds which is considered in the mesh cell (i,j), $\varepsilon_{i,j}^{D_{2i}}$, $\varepsilon_{i,j}^{D_{2j}}$, and $\varepsilon_{i,j}^{D_{ij}}$ are the weights at the mesh cell (i,j) for a derivative of order 2. According to one embodiment of the present invention, the weights are independent of the mesh cell (i,j). According to one embodiment in which the scale factor f is scalar and equals 2, the sampling intervals of a grid $G_k$ then being defined by $p_i^k = p_i^0 2^k$ and $p_j^k = p_j^0 2^k$, it is possible to define the weights in the mesh cell (i,j) by $\varepsilon_{i,j}^{D_{2i}} = p_j^k/(p_i^k)^3$, $\varepsilon_{i,j}^{D_{2j}} = p_i^k/(p_j^k)^3$, and $\varepsilon_{i,j}^{D_{ij}} = 1/(p_i^k p_j^k)$.

The objective function thus defined being nonlinear, a minimization procedure is sought based on an iterative approach. More precisely, this signifies that a procedure is used which, based on an objective function calculated on an initial model (here the measurements in the empty grid cells), will modify this model, iteration after iteration, until a minimum of the objective function is found. Numerous objective function minimization algorithms are known, such as the Gauss-Newton procedure, the Newton-Raphson procedure or else the conjugate gradient. According to a preferred embodiment of the present invention, the conjugate gradient procedure is used as an algorithm for minimizing the objective function F described previously.

The use of equation (1) (defined in step 1.1 for the determination of the number nk) guarantees that the number of iterations on the coarsest grid $G_{nk}$ is at least greater than the number of empty grid cells on this coarse grid $G_{nk}$, thereby ensuring minimization of the objective function for this coarse grid. Based on the optimal result on the coarse grid $G_{nk}$, it is then possible to initialize in an optimal manner the following coarse grid $G_{nk-1}$, and so on gradually, until the fine grid of interest $G_0$ is reached.

2) Construction of a Geological Model

This step entails constructing a geological model of the subterranean formation considered based on the geometry of each of the boundaries between beds which is completed for each grid cell of the fine grid $G_0$ according to steps 1.1) to 1.3) described previously. Thus, the boundaries between beds can be considered to be the "skeleton" of the geological model, and it is then appropriate to construct, based on this "skeleton", a volume. Preferentially, the volume in question is constructed in the form of a three-dimensional mesh, and at least one petrophysical property representative of the formation considered is allotted to each of the mesh cells of this three-dimensional mesh. The volumetric mesh can have the same lateral boundaries as the two-dimensional grid being considered.

In the case of the construction of the geological model for the stratigraphic inversion such as carried out in the Interwell® software (IFP Energies nouvelles, France), the following steps are carried out:

Each boundary between beds of the formation being studied in each of the mesh cells of the grid being considered is completed according to the steps described in section 1);

Geological units (that is sets of mesh cells of the volumetric mesh corresponding to one and the same geological event, such as the deposition of a given sedimentary bed), as well as the mode of deposition inside each of these geological units (deposition parallel to the roof or to the base of the bed, or consistent) are defined based on the boundaries of completed beds. The lamination inside the units is then defined;

A cube of the ages is constructed, which is a cube whose iso-values are the sedimentation isochrones (see for example Wheeler (1958) for details regarding chronostratigraphy);

For each geological unit, the values of petrophysical properties known at the wells (for example the impedances of the seismic waves P and S, the densities, scalars identifying the various facies) are interpolated along these sedimentation isochrones. Each mesh cell of a geological unit then contains petrophysical properties, and the volumetric mesh is constructed.

Additional information regarding the construction of a geological model for stratigraphic inversion such as carried out in the Interwell® software may be found in patent EP 0889331 A1, and corresponding U.S. Pat. No. 6,374,201 B1.

Figure 7:
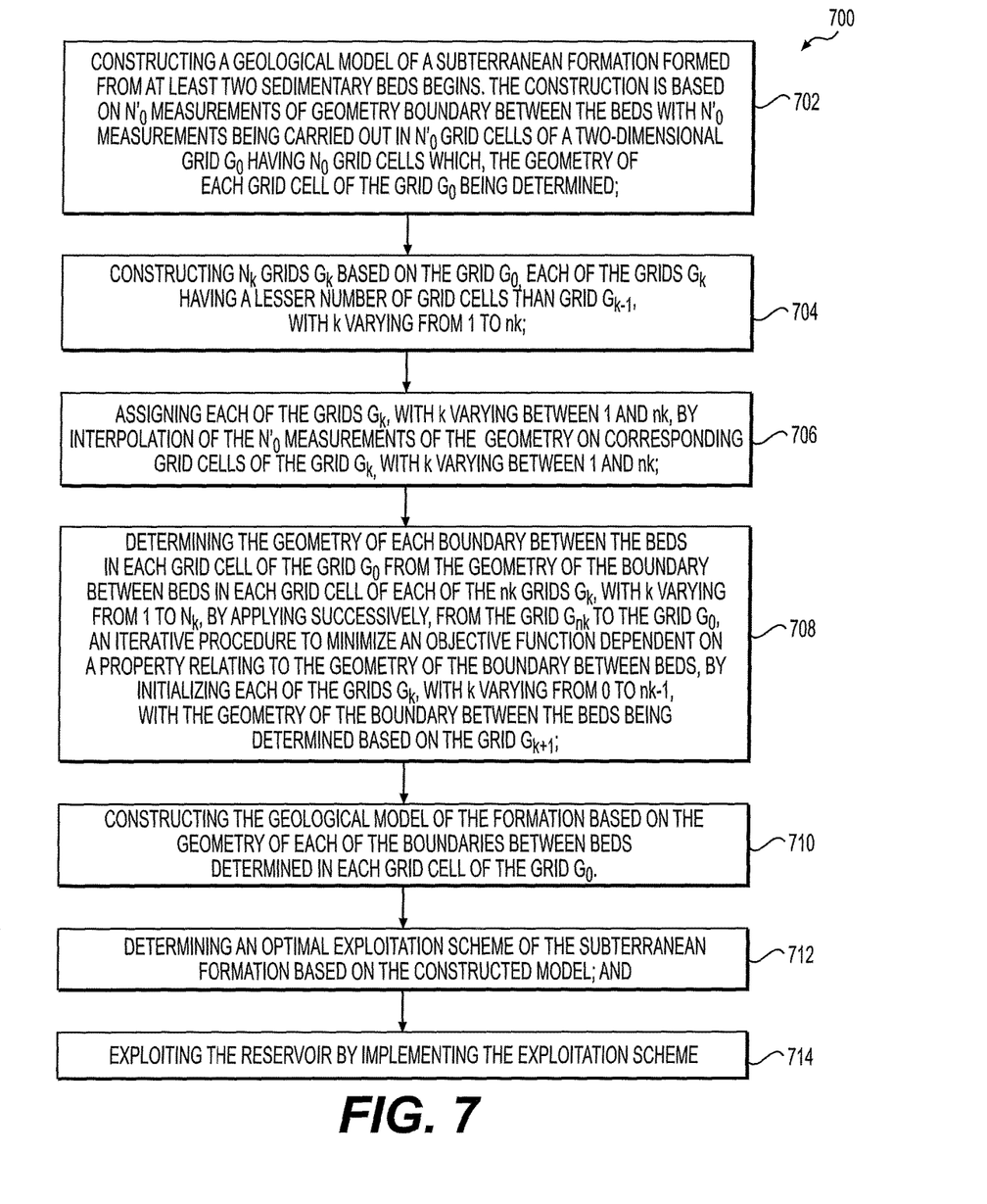
FIG. 7 is a flow chart of a method in accordance with the invention.

FIG. 7 illustrates a flow chart 700 of a method in accordance with the invention used for constructing a geological model of a formation which is used for exploitation of the formation as further described. The method 700 begins at step 702 where construction of a geological model of a subterranean formation formed from at least two sedimentary beds begins. The construction is based on $N'_0$ measurements of geometry for each boundary between the beds with $N'_0$ measurements of boundaries of the beds being carried out in $N'_0$ grid cells of a two-dimensional grid $G_0$ having $N_0$ grid cells for each boundary between the beds with $N'_0$ being an integer which is less $N_0$ which is an integer, the geometry of each grid cell of the grid $G_0$ being determined. The step 704 constructs nk grids $G_k$ based on the grid $G_0$, each of the grids $G_k$ having a lesser number of grid cells than grid $G_{k-1}$, with k varying from 1 to nk. The next step 706 assigns each of the grids $G_k$, with k varying between 1 and nk, by an interpolation of the $N'_0$ measurements of the geometry on corresponding grid cells of the grid $G_k$. The next step 708 determines the geometry each boundary between the beds in each grid cell of the grid $G_0$ of the boundary between beds of each of the nk grids Gk, with k varying from 1 to nk, by applying successively, from the grid $G_{nk}$ to the grid $G_0$, an iterative procedure to minimize an objective function dependent on a property relating to the geometry between beds, by initializing each of the grids $G_k$, with k varying from 0 to nk−1, with the geometry of the boundary between beds being determined based on the grid $G_{k+1}$. At step 710 the geological model of the formation is constructed based on the geometry of each of the boundaries between beds determined in each grid cell of the grid $G_0$. At step 712, based on the model constructed at step 710, an optimal exploitation scheme is determined as further described. At step 714, the reservoir is exploited by implementing the exploitation scheme determined at step 712.

Variants

Taking into Account of Faults

According to one embodiment of the present invention, the subterranean formation of interest comprises at least one boundary between sedimentary beds, and the beds are intercepted by at least one fault. In geology, a fault is a deformation in a plane along which two blocks of rock move with respect to one another. This plane divides a rock volume into two compartments which have slipped with respect to one another. Thus, a boundary between sedimentary beds which is intersected by an active fault gets cut with each piece being shifted by a distance, which is called the slip, one with respect to the other. It is very obvious that the criterion of continuity of the dips is meaningless at the level of a fault, or stated otherwise, it is very obvious that it is necessary to complete a boundary between beds by complying with the dips up until the mesh cells are intersected by the faults, and not across the faults.

According to a particular mode of implementation of the present invention, the fault is taken into account by considering a purely vertical slip. It is possible in this case to make the plane of the approximate vertical fault pass through the middle of the plane of the real fault. Preferentially, in the case of determining the geometry of a boundary of beds by minimizing the second derivatives (see step 1.3.2) as described previously), the second derivatives are zeroed in the mesh cells of the grids $G_k$, with k varying from 0 to nk, traversed by the vertical fault in question.

According to one embodiment of the present invention, for each grid $G_k$, with k varying from 0 to nk, the step, described in section 1.3.1), of initialization of each inverse problem is adapted to initialize each of the empty mesh cells located near a fault. Indeed, for a fault introducing a dislocation along the vertical axis, it is preferable, in order to best initialize an empty mesh cell situated near a fault, to take into account only the points situated on the same side of the fault as the empty mesh cell in question. Thus, preferentially, an empty mesh cell is initialized by extrapolating the measurements of the mesh cells close to the empty mesh cell and situated on the same side of the fault, instead for example of initializing it by an interpolation taking into account mesh cells situated on either side of the fault.

According to one embodiment of the present invention, once the geometry of the boundary between beds has been completed by considering a fault approximated by a vertical fault, the real fault can be repositioned automatically. Accordingly, in the case of a normal fault, in addition to the application of the method according to the invention with faults taken into account as described previously, the geometry of the boundary of between beds which is studied is determined by the method according to the invention without considering any fault. Next, by comparing the two results, the fault is repositioned, eliminating the geometry values determined between the vertical fault and the real fault.

Figure 1:
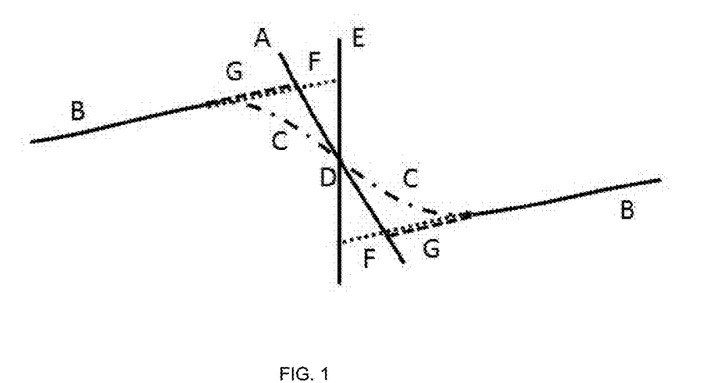
FIG. 1 illustrates an embodiment of the present invention for repositioning a real fault based on an interpolation/extrapolation carried out according to the method according to the invention applied while making the assumption of a vertical fault.

FIG. 1 presents the principle of this reconstruction. This figure shows a vertical fault E, which is a vertical approximation of the real fault A. B is a part of a boundary of beds which is distant from the fault. C is the interpolation of this boundary between beds (chain-dotted), without the fault. D is the intersection of the real fault A and of the surface C. E is the vertical fault passing through D. F is the dotted interpolation of the surface B with the vertical fault E. Finally, G presents the restriction (dashed) of the surface F, to comply with the real fault A.

Method of Exploitation

Furthermore, the invention relates to a method of exploiting a subterranean formation comprising at least one reservoir, in which the following steps are carried out:
- constructing a geological model representative of the distribution of at least one petrophysical property by use of the geological model construction method as described previously;
- determining an optimal exploitation scheme for the reservoir of the subterranean formation based on the model; and
- exploiting the reservoir by implementing the optimal exploitation scheme.

Based on the geological model obtained during the previous steps, several exploitation schemes can be determined corresponding to various possible configurations for exploiting the subterranean reservoir including location of the producer and/or injector wells, target values for the flowrates per well and/or for the reservoir, the type of tools used, the fluids used, injected and/or recovered, etc. For each of these schemes, it is appropriate to determine their production forecasts. These probabilistic production forecasts can be obtained by use of flow simulation software as well as by use of the fitted numerical reservoir model. A reservoir simulation is a technique making it possible to simulation of the flows of fluids within a reservoir by use of software, called a flow simulator, and of a reservoir model. For example, the PumaFlow® software (IFP Énergies nouvelles, France) is a flow simulator.

Based on the probabilistic production forecasts defined for each exploitation scheme, a comparison can be made to choose the exploitation scheme which seems the most relevant. For example:
- by comparing the maximum of the volume of oil recovered, it is possible to determine the production scheme likely to provide the maximum of recovery or to be the most profitable;
- by comparing the standard deviation of the volume of oil recovered, it is possible to determine the least risky production scheme.

The reservoir of the formation being studied is then exploited according to the exploitation scheme defined for example by drilling new wells (producer or injector), by modifying the tools used, by modifying the flowrates and/or the nature of injected fluids, etc.

Computer Program

The invention relates, moreover, to a computer program product downloadable from a communication network and/or recorded on a medium readable by computer and/or executable by a processor. This program comprises program code instructions for the implementation of the method such as described hereinabove, when the program is executed on the processor.

EXAMPLES OF APPLICATION

The characteristics and advantages of the method according to the invention will be more clearly apparent on reading the examples of application hereinafter.

Example 1: Case without Faults

In this example, a subterranean formation exhibiting a single boundary between beds is considered. Sparse measurements of the geometry of this boundary between beds are available on a fine grid $G_0$ formed of 500 by 700 grid cells, that is a number $N_0$ of 350,000 mesh cells. For this illustrative example, a number $N'_0$ of empty 340,000 grid cells will be considered. In order to complete the empty mesh cells of the mesh of interest, the conjugate gradient procedure is chosen to solve an inverse problem, such as described in the previous step 1.3.2), based on the minimization of the second derivatives.

Figure 2:
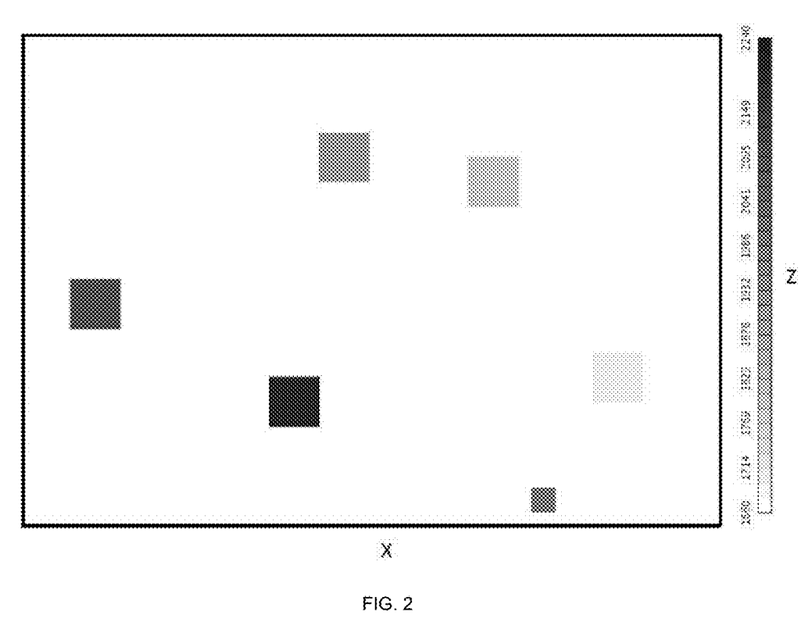
FIG. 2 shows the location of $N'_0$ measurements (hatched squares) of the geometry of the boundary of beds of a given subterranean formation, carried out on a fine grid having 700 grid cells in the direction X and 700 grid cells in the direction Y. The color palette presented in this Figure is also used for FIGS. 3 to 6.

FIG. 2 shows, by hatched squares 40, the $N'_0$ measurements of the geometry of the considered boundary of beds being carried out on the fine grid $G_0$. It may thus be observed that the 10,000 measurements of the geometry have been carried out in six very distinct zones and that the measured depth varies between 1700 and 2200 m.

In theory, if completion of the grid of interest is chosen without resort to solving, such as according to the invention, intermediate problems on coarse grids, with the inverse problem of the fine grid having 340,000 unknowns, it would be necessary to carry out at least 340,000 iterations of conjugate gradient which is extremely expensive in terms of calculation time.

It is chosen to apply the method according to the invention by using a scalar scale factor f equal to 2. Thus, a coarse grid $G_k$, with k varying from 1 to nk, is an enlargement by a factor 2 of the grid $G_{k-1}$. In order to choose in an optimal manner the number nk of coarse grids to be considered, equation (1) is used which was described previously. A number Iter=100 of iterations is chosen to be carried out to solve the inverse problem on the fine grid. This involves very much less than the 340,000 iterations required without resorting to the method according to the invention. And it was decided to double the iterations from one grid to another. A number nk=4, i.e. 4 coarse grids, is then obtained according to formula (1). Thus, the coarse grid $G_1$ is characterized by 4 times fewer grid cells than the grid $G_0$, i.e. about 85,000 empty mesh cells, the grid $G_2$ by 16 times fewer, i.e. 21,000 empty grid cells, the grid $G_3$ by 64 times fewer mesh cells, i.e. about 5300 empty grid cells, and the grid $G_4$ by 256 times fewer grid cells, i.e. about 1300 empty grid cells (see the right-hand column of Table 1). It may therefore be noted that the number of unknowns for the coarsest grid $G_4$ is very restricted. Moreover, by doubling the iterations of conjugate gradient from one grid to another (see the middle column of Table 1), it is noted that the number of iterations of conjugate gradient for the coarsest grid $G_4$ is greater than the number of unknowns for this grid, that is 1600 iterations as against 1300 unknowns. This therefore ensures that the conjugate gradient converges completely for the grid $G_4$, and this makes it possible to correctly initialize the grid $G_3$ and thus to obtain a satisfactory result on $G_3$, doing so without having to perform 5300 iterations of conjugate gradient but only 800 (see the middle column of Table 1). And so on and so forth until the grid $G_0$, which, correctly initialized with the result on the grid $G_1$, after 200 iterations, will require only 100 iterations in order to complete 340,000 empty mesh cells.

TABLE 1

| Grid number | Number of iterations | Number of empty mesh cells |
| --- | --- | --- |
| $G_4$ | 1600 | 1300 |
| $G_3$ | 800 | 5300 |
| $G_2$ | 400 | 21 000 |
| $G_1$ | 200 | 85 000 |
| $G_0$ | 100 | 340 000 |

Figure 3:
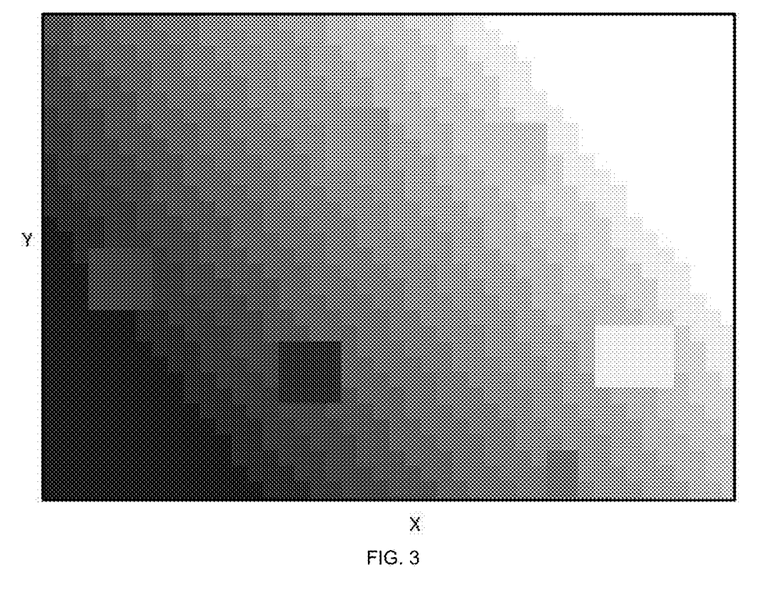
FIG. 3 presents the result of the initialization step 1.3.1) for a coarse grid $G_4$, consisting of 256 times fewer grid cells than the fine grid $G_0$.

FIG. 3 presents the result of the step of initialization described in section 1.3.1) of the coarse grid $G_4$, carried out on the basis of the result of the assignment step described in section 1.2). In this Figure, also superimposed, for information purposes, are measurements resulting from this assignment step. The coarse grid $G_4$ is a grid which is enlarged 16 times with respect to the fine grid $G_0$.

FIGS. 4A to 4D present, for the boundary of beds being studied, the result of step 1.3.2) applied respectively for the intermediate grids $G_4$ to $G_1$, that is to say for finer and finer grids. The final result of the method according to the invention, on the fine grid $G_0$, is that presented in FIG. 4E. It is observed in these Figures that the major trends of the geometry of the boundary of beds 40 being studied were already present for the coarsest grid $G_4$, and that by passing from a coarser grid to a less coarse grid it is possible to specify this geometry more precisely. Moreover, it may be noted that the boundary of beds 40 is well interpolated/extrapolated while complying with the continuity of the dips, which was expected since an inverse problem was solved aimed at minimizing the second derivatives of the geometry of the boundary of beds at the level of the mesh cells to be completed. Thus, this embodiment of the method according to the invention makes it possible to ensure continuity of the dips, which is required by numerous applications in the oil exploration and exploitation sector.

The results obtained show that a hundred or so iterations on the fine grid of interest amply suffice for an accurate determination of the solution. By way of indication, the calculation times (on a Dell T3610 work station) as a function of the number of iterations of conjugate gradient and of the number of grids considered are given in Table 2. It is observed that the result on the fine grid, when having considered 4 intermediate coarse grids, is obtained according to the invention in only 3 seconds, whereas the interpolation/extrapolation on the fine grid, without involving intermediate grids, would have taken 1 h.

Thus, this example shows that by initializing an inverse problem with the result of an inverse problem solved on a coarser grid it is possible to limit the calculation times very greatly. This advantage makes it possible to process very large size grids (with several million mesh cells), for geological formations exhibiting numerous bed boundaries. Moreover, the interpolation/extrapolation method according to the invention is entirely automatic and does not require any manual intervention.

TABLE 2

| Number of grids | Calculation time |
| --- | --- |
| 1 | 1 hour |
| 2 | 11 minutes |
| 3 | 78 seconds |
| 4 | 12 seconds |
| 5 | 3 seconds |

Example 2: Case with Faults

Through this example, it is proposed to determine the geometry of the same boundary of beds as that described in the previous example, but in the case where five faults are present.

Figure 5:
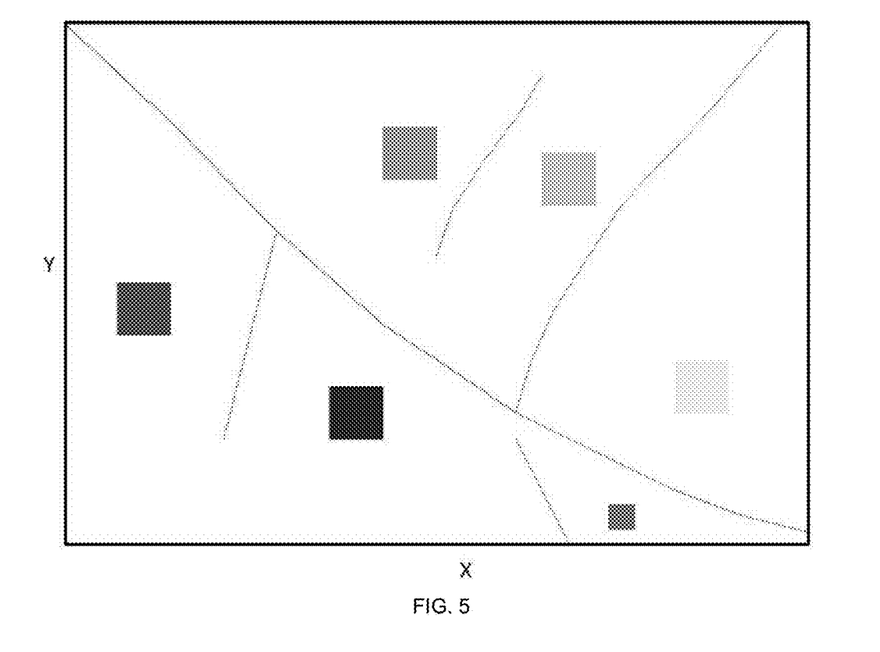
FIG. 5 presents the position of $N'_0$ measurements (hatched squares) of the geometry of a boundary between beds of a given formation with respect to the position of five planes of faults characterizing this formation (curved lines).
Figure 6:
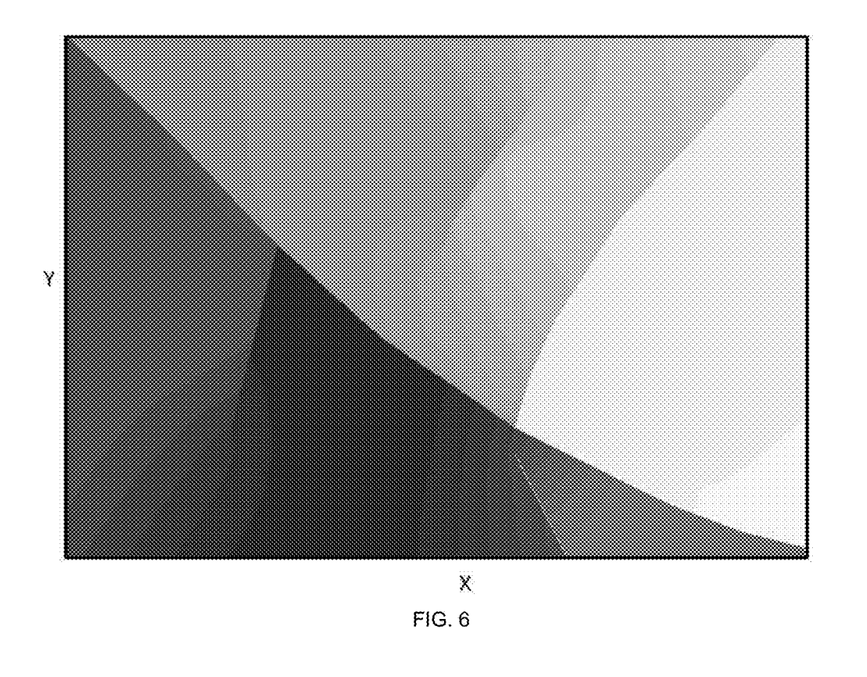
FIG. 6 presents the result of the application of the method according to the invention, implemented while taking into account the faults presented in FIG. 5.

FIG. 5 presents the location of the $N'_0$ measurements (hatched squares) with respect to the five fault planes in question (curved lines). FIG. 6 presents the result of the method according to the invention applied with the same characteristics as in the previous example, but taking the faults into account, as is described in a variant of the method according to the invention. In particular, a step of adaptation to the case of the faults of the step described in section 1.3.1 of initialization of each inverse problem has been implemented. It may thus be noted in this Figure that the method according to the invention makes it possible to take account of the location of the faults, by interrupting the process of interpolation/extrapolation of a boundary of beds at the level of the faults, and while preserving the continuity of the dips outside of the faults. Moreover, the calculation times in the case of the application of the method according to the invention with faults are very similar to those obtained in the case without faults (cf Table 2). Indeed, the adaptation to the case of the faults of the step described in section 1.3.1) of initialization of each inverse problem, ensuring correct initialization, makes it possible to preserve a restricted number of iterations.

Thus the method according to the invention makes it possible to complete, in an effective and automatic manner, and while preserving the dips, geometries of bed boundaries, even in the case where faults are present.

The invention claimed is:

1. A method of exploiting a subterranean formation by constructing a geological model of a subterranean formation formed from at least two sedimentary beds based on $N'_0$ measurements of geometry of boundaries between the beds with $N'_0$ measurements of the boundary between the beds being carried out in $N'_0$ grid cells of a two-dimensional grid $G_0$ having $N_0$ grid cells which for each boundary between the beds, $N'_0$ is an integer less than $N_0$ which is also an integer, the geometry of each boundary for each cell of the grid $G_0$ being determined by steps comprising:
   a) constructing nk intermediate grids $G_k$ based on the grid $G_0$, each of the grids $G_k$ having a lesser number of grid cells than grid $G_{k-1}$ with nk being an integer equal to or greater than 1, k varying from 1 to nk and k−1 being an integer value of 1 less than k;
   b) assigning each of the grids $G_k$, with k ranging between 1 and nk, by interpolation of the $N'_0$ measurements of the geometry on corresponding mesh cells of the grid $G_k$ with k varying between 1 and nk;
   c) determining the geometry of each boundary between the beds in each grid cell of the grid $G_0$ from the geometry of the boundary between beds in each grid cell of each of the nk grids $G_k$, with k varying from 1 to nk, by applying successively, from the grid $G_{nk}$ to the grid $G_0$, an iterative procedure to minimize an objective function dependent on a property relating to the geometry of the boundary between beds, by initializing each of the grids $G_k$, with k varying from 0 to nk−1 with nk−1 being an integer value one less than an integer value of nk geometry of the boundary between beds being determined based on the grid $G_{k+1}$, with k+1 being an integer value one greater than an integer value of k;
   d) constructing the geological model of the formation based on the geometry of each of the boundaries between beds determined in each grid cell of the grid $G_0$;
   e) determining an optimal exploitation scheme of the subterranean formation based on the constructed model; and
   f) exploiting the reservoir by implementing the exploitation scheme.

2. A method according to claim 1 comprising:
constructing nk grids $G_k$, with k varying from 1 to nk, by applying a scale factor successively nk times to the spatial sampling intervals of the grid $G_0$.

3. A method according to claim 2, wherein the scale factor is a vector and has a scalar value in each direction of a reference frame of the grid $G_0$.

4. A method according to claim 2, wherein the scale factor is scalar.

5. A method according to claim 4, wherein the scale factor equals 2.

6. A method according to claim 4, wherein based on a predefined number of iterations iter and an assumption of a doubling of iterations of an iterative procedure from a grid $G_k$ to a grid $G_{k+1}$, with k varying from 1 to nk, and an optimal number nk of the grids $G_k$ to be constructed is determined from a formula $$nk = \text{ceiling}\left(\log 2\left(\frac{N_0 - N'_0}{Iter}\right)/3\right)$$

with ceiling being a function which associates a real number with an immediately higher integer and Iter is a number of iterations.

7. A method according to claim 1, wherein the property relating the geometry of the boundary of the beds is continuity of dips in a mesh cell with a dip being an angle between a line of greatest slope of a plane boundary of the beds.

8. A method according to claim 7, wherein the objective function for a grid $G_k$ is dependent on a sum of second derivatives of a property calculated at a level of mesh cells to be completed for a grid being considered.

9. A method according to claim 7 comprising accounting for a presence of vertical faults at a boundary between beds by setting a second derivative of an equation of the boundary between beds equal to zero at a level of the vertical faults.

10. A method according to claim 1 wherein an iterative procedure used to minimize the objective function utilizes a conjugate gradient.

11. A method according to claim 1 comprising initializing each cell of a grid $G_k$, based on a bi-lateral interpolation of the geometry of the boundary of beds determined in each mesh cell of the grid $G_{k+1}$.

12. A method according to claim 1 comprising constructing the geological model using a volumetric mesh based on each of the boundaries of beds and allotting to each mesh cell of the volumetric mesh at least one value of a petrophysical property representative of the formation.

13. A computer program product downloadable from at least one communication network which is non-transiently recorded on a tangible recording medium which is executed by a processor comprising program code instructions for implementing the method of claim 1.

* * * * *